United States Patent [19]

Painchaud et al.

[11] Patent Number: 5,748,814
[45] Date of Patent: May 5, 1998

[54] METHOD FOR SPATIALLY CONTROLLING THE PERIOD AND AMPLITUDE OF BRAGG FILTERS

[75] Inventors: Yves Painchaud, Québec; Pierre Langlois, Ste-Catherine-de-la Jacques-Cartier; Pierre Galarneau; Alain Chandonnet, both of Cap-Rouge; Jocelyn Lauzon, St-Augustin-de-Desmaures, all of Canada

[73] Assignee: Institut National D'Optique, Sainte-Foy, Canada

[21] Appl. No.: 558,372

[22] Filed: Nov. 16, 1995

[51] Int. Cl.⁶ .............................. G02B 6/34; G02B 5/18
[52] U.S. Cl. .............................. 385/37; 359/569; 359/573
[58] Field of Search .................... 385/37, 33, 10, 385/123; 359/569, 570, 571, 572, 573

[56] References Cited

U.S. PATENT DOCUMENTS

| | | | |
|---|---|---|---|
| 4,474,427 | 10/1984 | Hill et al. | 385/37 |
| 4,725,110 | 2/1988 | Glenn et al. | 385/37 |
| 4,807,950 | 2/1989 | Glenn et al. | 385/37 |
| 5,066,133 | 11/1991 | Brienza | 385/37 |
| 5,309,260 | 5/1994 | Mizrahi et al. | 385/37 |
| 5,327,515 | 7/1994 | Anderson et al. | 385/37 |
| 5,351,321 | 9/1994 | Snitzer et al. | 385/37 |
| 5,363,239 | 11/1994 | Mizrahi et al. | 359/570 |
| 5,367,588 | 11/1994 | Hill et al. | 385/37 |
| 5,384,884 | 1/1995 | Kashyap et al. | 385/37 |
| 5,388,173 | 2/1995 | Glenn | 385/37 |
| 5,400,422 | 3/1995 | Askins et al. | 385/37 |
| 5,420,948 | 5/1995 | Byron | 385/37 |
| 5,502,786 | 3/1996 | Inniss et al. | 385/37 |
| 5,619,603 | 4/1997 | Epworth et al. | 385/37 |

OTHER PUBLICATIONS

Photosensitivity in Optical Fiber Waveguides; Application To Reflection Filter Fabrication; K.O. Hill et al.; Communications Research Centre, Ottawa, Ontario, Canada; Received 27 Dec. 1977; Accepted for publication 10 Mar. 1978; Appl. Phys. Lett., vol. 32, No. 10, 647–649.

Formation Of Bragg Gratings in Optical Fibers By A Transverse Holographic Method; G. Meltz et al/: United Technologies Research Center, East Hartford, Connecticut; Received Feb. 6, 1989; Accepted Apr. 28, 1989; Optics Letters, vol. 14, No. 15, 823–825.

Bragg Gratings Fabricated In Monomode Photosensitive Optical Fiber By UV Exposure Through A Phase Mask; K.O. Hill et al.; Communications Research Center, P.O. Box 11490, Station "H", Ottawa, Ontario, Canada; Received 5 Nov. 1992; Accepted for publication 5 Jan. 1993; Appl. Phys. Lett., vol. 62, No. 10, 1035–1037.

(List continued on next page.)

Primary Examiner—Akm E. Ullah
Assistant Examiner—Hemang Sanghavi
Attorney, Agent, or Firm—Merchant, Gould, Smith, Edell, Welter & Schmidt, P.A.

[57] ABSTRACT

A method for spatially controlling the period and amplitude of Bragg filters in an optical medium having a longitudinal axis that is sensitive to at least some wavelength of electromagnetic radiation. A phase mask of period $\Lambda$ is laid close to the optical medium at an angle $\alpha$ with respect to the longitudinal axis of the optical medium. A single beam of electromagnetic radiation is directed at an incidence angle $\phi$ with respect to normal incidence on the phase mask so that the radiation is diffracted, resulting in an interference pattern having a period P impinged into the optical medium so that the period P of the interference pattern may be altered by changing the incidence angle $\phi$ or the angle $\alpha$. This method is simpler, more flexible and more suitable for mass production than existing methods.

2 Claims, 4 Drawing Sheets

OTHER PUBLICATIONS

Production Of In-Fibre Gratings Using A Diffractive Optical Element; D.Z. Anderson et al.; Electronics Letters 18th Mar. 1993—vol. 29—No. 6.

Wavelength Flattened Saturated Erbium Amplifier Using Multiple Side-Tap Bragg Gratings; R. Kashyap et al.; Electronics Letters 27th May 1993—vol. 29—No. 11.

Magnification Of Mask Fabricated Fibre Bragg Gratings; J.D. Prohaska et al.; Electronics Letters 2nd Sep. 1993—vol. 29—No. 18.

"Novel Writing Technique Of Long And Highly Reflective In-Fibre Gratings"; J. Martin et al; Electronics Letters 12th May 1994—vol. 30—No. 10.

"Very Broad Reflection Bandwidth (44nm) Chirped Fibre Gratings And Narrow Bandpass Filters Produced By The Use Of An Amplitude Mask"; M.C. Farries et al.; Electronics Letters 26th May 1994—vol. 30—No. 11.

"Novel Method Of Producing All Fibre Photoinduced Chirped Gratings"; R. Kashyap et al.; Electronics Letters 9th Jun. 1994—vol. 30—No. 12.

"Chirped Fibre Gratings Produced By Tilting The Fibre"; Y. Painchaud et al.; Electronics Letters 2nd Feb. 1995—vol. 31—No. 3.

"Moving Fibre/Phase Mask-Scanning Beam Technique For Enhanced Flexibility in Producing Fibre Gratings With Uniform Phase Mask"; M.J. Cole et al.; Electronics Letters 17 Aug. 1995—vol. 31—No. 17.

METHOD FOR SPATIALLY CONTROLLING THE PERIOD AND AMPLITUDE OF BRAGG FILTERS

FIELD OF THE INVENTION

The invention relates to a method for spatially controlling the period and amplitude of Bragg gratings in an optical medium written with electromagnetic radiation.

DESCRIPTION OF THE PRIOR ART

It is known in the art that UV light can be used transversally to permanently increase the refractive index of an optical fiber. Further, it is known that by illuminating an optical fiber with a UV-light interference pattern, a periodic index change is produced in the core of the optical fiber, and thus a strongly selective wavelength reflection filter is obtained.

By using techniques such as interferometry, transverse holography or phase masking to obtain an interference pattern of the UV-light, a Bragg grating is impressed in the core of the optical fiber.

U.S. Pat. No. 5,327,515 (Anderson et al.) describes a method for processing optical media in order to form gratings within them. The gratings are impressed by a single actinic beam through a phase mask having a given period. The beam may be at an angle θ with respect to normal incidence (z-axis) on the phase mask. Furthermore, the optical fiber itself may be at an angle in the x- and y-axes. However, the author does not discuss the effects of using angles other than 0, when interference of orders ±1 are used to produce the periodic index change in the core of the fiber.

This patent suggests that the amplitude of the fiber grating may be adjusted by moving the beam along the axis of the fiber. The disadvantage with this method is that the phase may drift slightly due to the movement of the beam, resulting in an uneven filter.

Reference may also be made to the following patents and articles: U.S. Pat. No. 4,474,427 (Hill et al.); U.S. Pat. No. 4,725,110 (Glenn et al.); U.S. Pat. No. 4,807,950 (Glenn et al.); U.S. Pat. No. 5,363,239 (Mizrahi et al.); U.S. Pat. No. 5,351,321 (Snitzer et al.); U.S. Pat. No. 5,367,588 (Hill et al.); U.S. Pat. No. 5,384,884 (Kashyap et al.); U.S. Pat. No. 5,388,173 (Glenn); U.S. Pat. No. 5,420,948 (Byron); HILL et al., "Photosensitivity in Optical Fiber Waveguides: Application to Reflection Filter Fabrication", Appl. Phys. Lett., Vol. 32, No. 10, 647–649, 15 May 1978; MELTZ et al., "Formation of Bragg Gratings in Optical Fibers by Transverse Holographic Method", Optics Letters, Vol. 14, No. 15, 823–825, 1 Aug. 1989; HILL et al, "Bragg Gratings Fabricated in Monomode Photosensitive Optical Fiber by UV Exposure Through a Phase Mask", Appl. Phys. Lett., Vol. 62, No. 10, 1035–1037, 8 Mar. 1993; ANDERSON et al., "Production of In-Fibre gratings Using a Diffractive Optical Element", Electronics Letters, Vol. 29, No. 6, 566–568, 18 Mar. 1993; KASHYAP et al., "Wavelength Flattened Saturated Erbium Amplifier Using Multiple Side-Tap Bragg Gratings", Electronics Letters, Vol. 29, No. 11, 1025–1026, 27 May 1993; PROHASKA et al., "Magnification of Mask fabricated Fibre Bragg Gratings", Electronics Letters, Vol. 29, No. 18, 1614–1615, 2 Sep. 1993, MARTIN et al., "Novel Writing Technique of Long and Highly Reflective In-Fibre Gratings", Electronics Letters, Vol. 30, No. 10, 811–812, 12 May 1994; FARRIES et al., "Very Broad Reflection Bandwidth (44 nm) Chirped Fibre Gratings and Narrow Bandpass Filters Produced by the Use of an Amplitude Mask", Electronics Letters, Vol. 30, No. 11, 891–892, 26 May 1994; KASHYAP et al., "Novel Method of Producing All Fibre Photoinduced Chirped Gratings", Electronics Letters, Vol. 30, No. 12, 996–998, 9 Jun. 1994; PAINCHAUD et al, "Chirped Fibre Gratings Produced by Tilting the Fibre", Electronics Letters, Vol. 31, No. 3, 171–172, 2 Feb. 1995; and COLE et al, "Moving Fibre/Phase Mask-Scanning Beam Technique for Enhanced Flexibility in Producing Fibre Gratings with Uniform Phase Mask", Electronics Letters, Vol. 31, No. 17, 1488–1490, 17 Aug. 1995.

SUMMARY OF THE INVENTION

A first object of the invention is to provide an improved method for spatially controlling the period and amplitude of Bragg filters in an optical medium which is simpler, more flexible and more suitable for mass production.

In accordance with the invention, this first object is achieved by an improved method for spatially controlling the period and amplitude of Bragg filters in a optical medium having a longitudinal axis that is sensitive to at least some wavelength of electromagnetic radiation comprising the steps of:

providing an optical phase mask of period A;

laying the phase mask close to the optical medium; and impinging a single beam of electromagnetic radiation on the phase mask such that the radiation is diffracted, thereby resulting in an interference pattern having a period P that is impinged into the optical medium; where the single beam of electromagnetic radiation is directed at an incidence angle φ with respect to normal incidence on the phase mask; and the phase mask is at an angle α with respect to the longitudinal axis of the optical medium;

so that the period P of the interference pattern is altered by changing either the incidence angle φ or the angle α.

It is a second object of the invention to provide an improved method for producing linearly chirped Bragg gratings in an optical medium.

In accordance with the invention, this second object is achieved by an improved method as described above, where a lens of focal length f is placed at a distance d from the phase mask, so that an interference pattern for which the period varies linearly along the optical medium is produced.

It is a third object of the invention to provide an improved method for producing linearly-chirped Bragg gratings in an optical medium where the magnitude of the index change varies as a function of the longitudinal axis of the optical medium.

In accordance with the invention, this third object is achieved by an improved method as described above, where a moving slit is placed between the single beam of electromagnetic radiation and the lens, so that the amplitude of the Bragg grating is controlled by adjusting the amount of radiation received by each portion of the grating.

BRIEF DESCRIPTION OF THE DRAWINGS

The present invention and its advantages will be more easily understood after the reading of the following non-restrictive description of the preferred embodiments thereof, made with reference to the following drawings where.

DESCRIPTION OF PREFERRED EMBODIMENTS OF THE INVENTION

The following description will be made with reference to glass optical fibers, but it should be understood that it is applicable to any optical medium that is sensitive to at least some wavelength of electromagnetic radiation.

Figure 1:
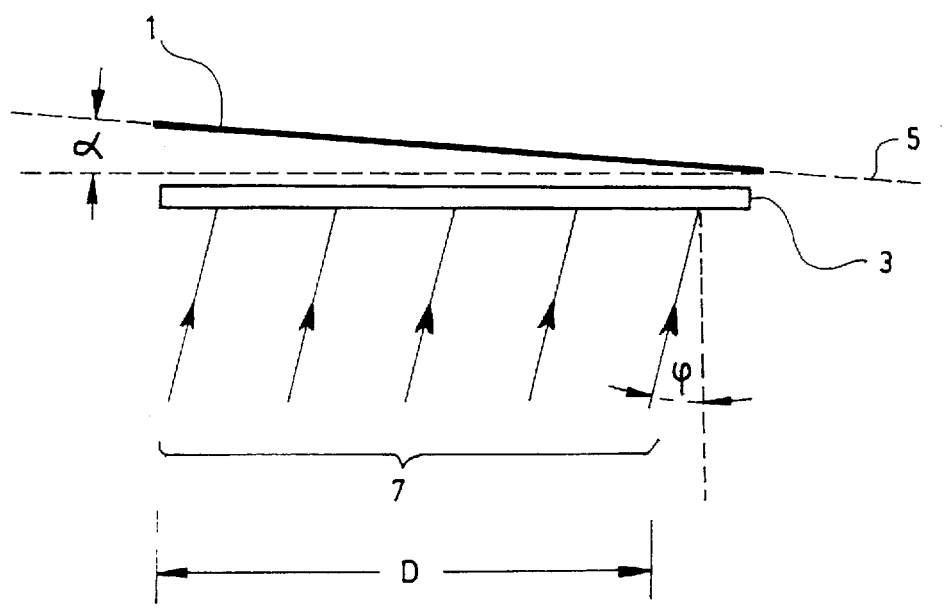
FIG. 1 is a schematic representation of the first preferred embodiment of the invention.

In a first preferred embodiment shown in FIG. 1, a phase mask 3 of period $\Lambda$ is laid close to an optical fiber 1 having a longitudinal axis 5. A single beam 7 of electromagnetic radiation, preferably ultra-violet light (hereinafter denoted by "UV"), having a wavelength $\lambda$ and a width D, is directed on the phase mask 3 such that the radiation is diffracted by the phase mask 3. This results in an interference pattern (not shown) having a period P being impinged into the optical fiber 1.

When the fiber 1 is not parallel to the phase mask 3 but rather forms a tilt angle $\alpha$ with the phase mask 3 and the UV beam 7 is incident on the phase mask 3 at an incidence angle $\phi$, the period P of the interference pattern along the axis 5 of the optical fiber 1 is given by the following expression (assuming that orders other than ±1 are negligible):

$$P = \frac{\Lambda}{2\cos\alpha} \left( 1 + \frac{\Lambda}{\lambda} \sin\theta \sin\beta \tan\alpha \right)^{-1} \quad [1]$$

where $\theta = (\theta_1 + \theta_2)/2$ $\beta = \phi - \theta_2 + \theta$ $\theta_1 = \arcsin(\lambda/\Lambda + \sin\phi) - \phi$ $\theta_2 = \arcsin(\lambda/\Lambda - \sin\phi) + \phi$ For small angles $\alpha$ and $\phi$, equation [1] reduces to:

$$P = \frac{\Lambda}{2} \left( 1 + \frac{\alpha^2}{2} - \alpha\phi \left( 1 - \frac{\lambda^2}{\Lambda^2} \right)^{-1/2} \right) \quad [2]$$

Thus, for a tilt angle $\alpha$ different from 0, the period P of the interference pattern can be modified by changing the incidence angle $\phi$ of the UV beam 7 or the angle $\alpha$. This result can be used to precisely control the period of periodic Bragg gratings. Preferably for this purpose, the tilt angle $\alpha$ is equal to the incidence angle $\phi$, by having the beam 7 preferably directed toward the fiber 1 at normal incidence with respect to the axis 5 of the fiber 1. Thus, the optical fiber 1 is fixed with respect to the UV beam 7 and only the phase mask 3 is rotated in order to control the period P of the grating. From equation [2], valid for small angles, the relationship between the wavelength at which the optical fiber 1 reflects (the Bragg wavelength, denoted hereinafter by $\lambda_B$) and the incidence angle $\phi$ is given by:

$$\lambda_B = n\Lambda(1-\gamma\phi^2/2) \quad [3]$$

where $\gamma = 2(1-\lambda^2/\Lambda^2)^{-1/2} - 1$ and n is the core index of the fiber 1, so that by adjusting the incidence angle $\phi$, the Bragg wavelength $\lambda_B$ can be controlled.

Figure 4:
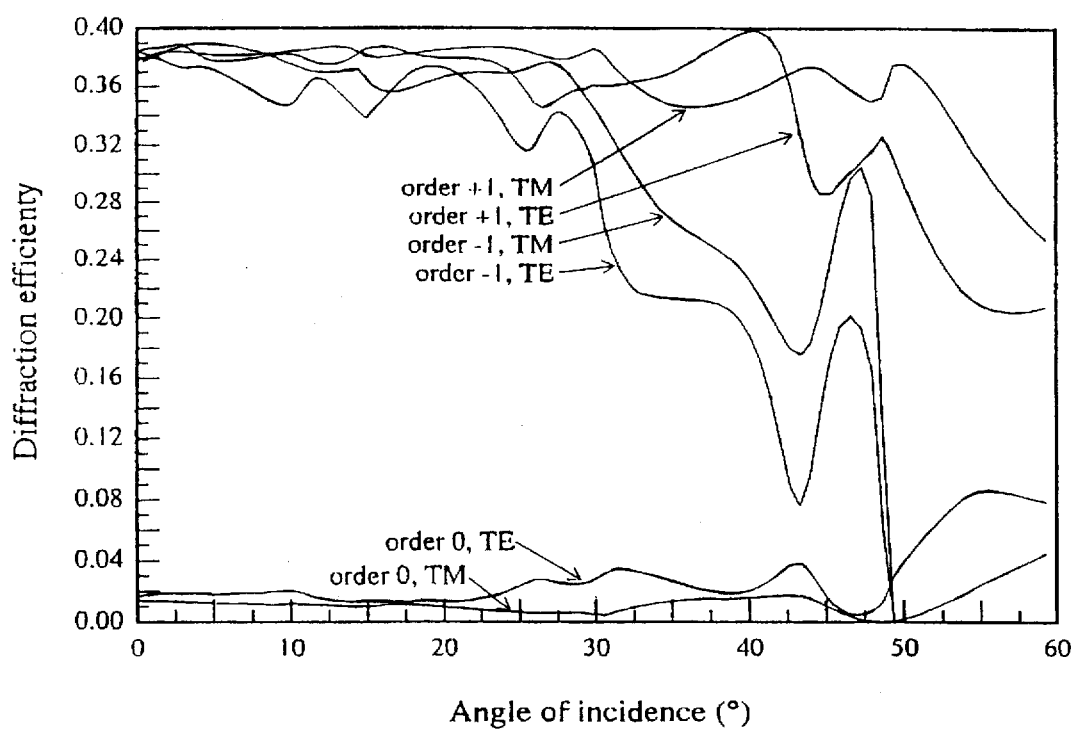
FIG. 4 shows the diffraction efficiency as a function of the angle of incidence for 0 and ±1 orders for TE and TM polarizations, for a binary phase mask having a period of 1.06 microns and a duty cycle of 0.5.

Since the method involves the use of a phase mask 3 out of normal incidence, the dependence of the diffraction efficiencies on the angle of incidence $\phi$ must be considered. As can be seen in FIG. 4, the diffraction efficiencies of 0 and ±1 orders as a function of the incidence angle $\phi$ for both TE and TM polarizations remain almost identical for incidence angles $\phi$ smaller than 20°. Thus, the method must be limited to incidence angles $\phi$ between 0° and 20°, which allows for a very good flexibility. Curves of FIG. 4 were calculated considering a typical binary phase mask having a period of 1.06 microns and a duty cycle of 0.5.

Figure 5:
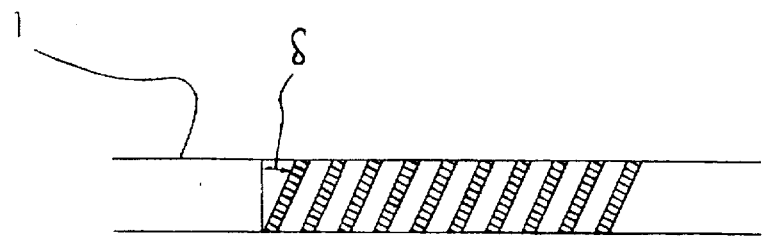
FIG. 5 is a schematic representation of a blazed grating.

Furthermore, the method also involves irradiation of the fiber 1 by an interference pattern with the fringes tilted at a certain angle with respect to the fiber axis 5, resulting in a blazed angle $\delta$, shown in FIG. 5, given by:

$$\delta = \beta - \alpha \quad [4]$$

where $\beta$ is defined above.

It is important that the blazed angle $\delta$ remains small in order to avoid a coupling of the propagating light outside of the fiber 1. The condition that must be met is:

$$\delta < \frac{1}{2} \arcsin\left( \frac{N.A.}{n} \right) \quad [5]$$

where N.A. is the numerical aperture and n is the core index of the fiber 1.

For example, in a typical telecommunications fiber, n=1.45 and N.A.=0.12, so that $\delta$ must remain below 2.4°.

According to the first preferred embodiment of the invention, the period P of the grating is adjusted only by rotating the phase mask 3, so that $\alpha = \phi$. Since $\beta$ is approximately equal to $\phi$, the condition $\alpha = \phi$ leads to an almost unblazed grating. More precisely, for $\phi = 20°$, the blazed angle $\delta$ is 0.8°. For example, for a grating made in the 1550 nm region and an incidence angle $\phi$ between 0° and 20°, which is sufficient for most applications, the blazed angle $\delta$ does not exceed 0.8°.

Figure 6:
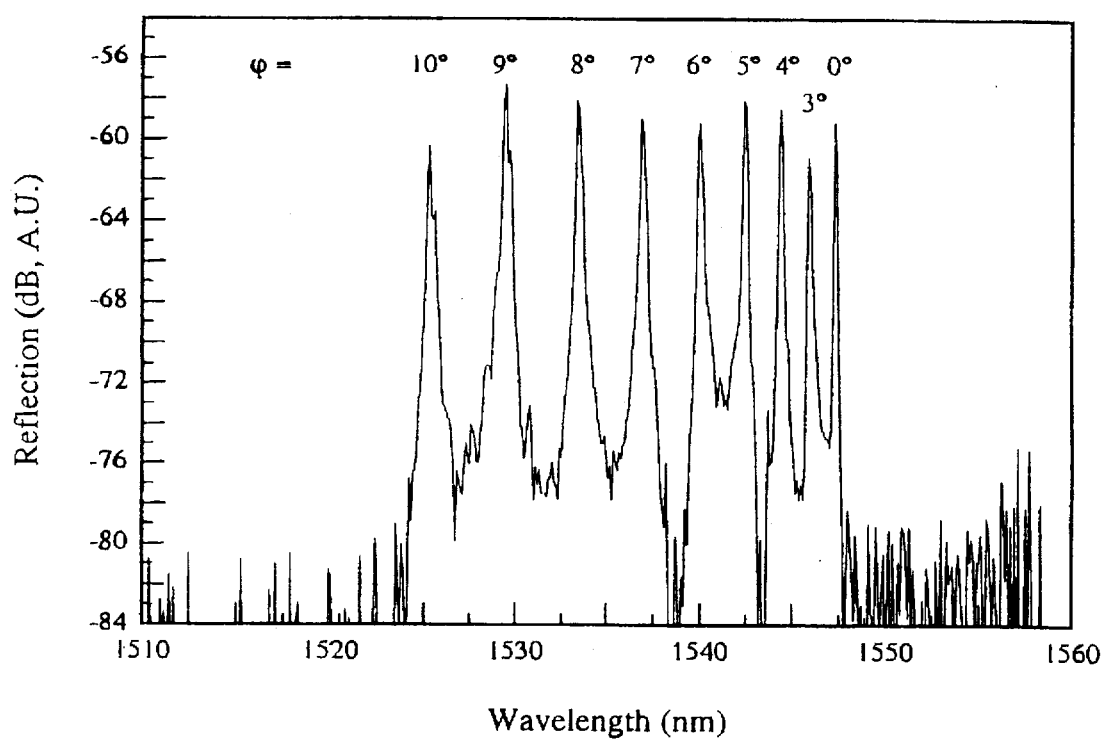
FIG. 6 shows the reflection spectrum of various gratings of different Bragg wavelength obtained using the first preferred embodiment of the invention.

Experimental tests have shown that the Bragg wavelength $\lambda_B$ may be tuned with this method. FIG. 6 presents the reflection spectrum of a fiber 1 in which nine gratings of different periods were written side by side by rotating the phase mask 3. As can be seen from FIG. 6, the result shows a tuning of the Bragg wavelength $\lambda_B$ by 22 nm over the 10° range of the incidence angle $\phi$. This is in accordance with the theoretical prediction of 25 nm from equation [3].

Thus, the Bragg wavelength $\lambda_B$ can be precisely tuned by simply rotating the phase mask 3 in a simple manner which is appropriate for mass production.

Figure 2:
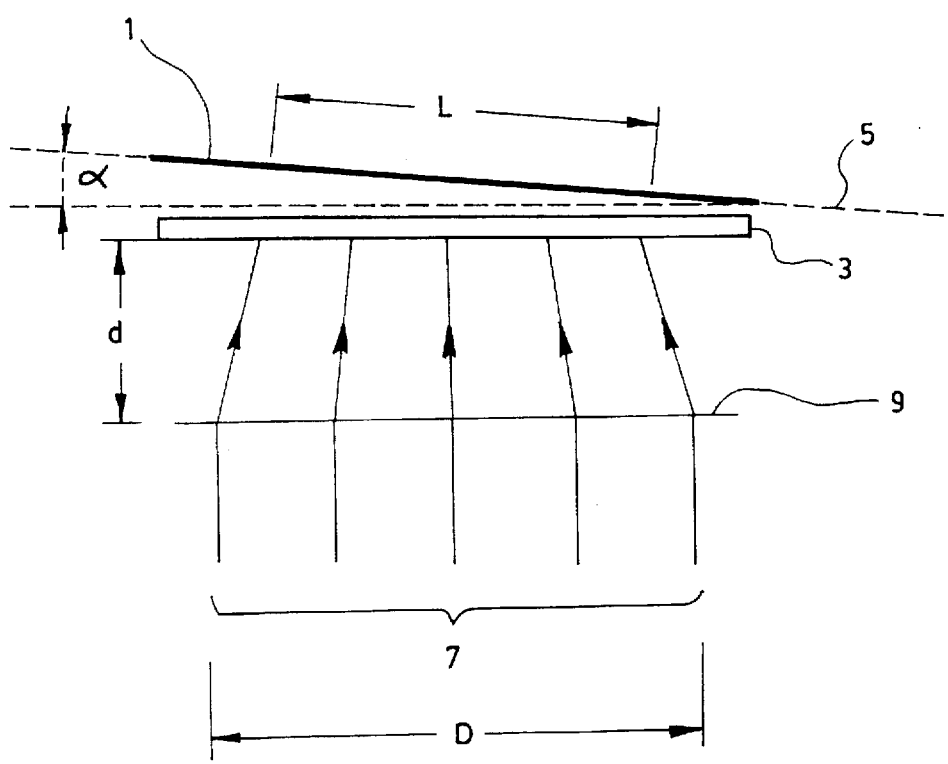
FIG. 2 is a schematic representation of the second preferred embodiment of the invention.

In a second preferred embodiment of the invention shown in FIG. 2, the above-mentioned method comprises an additional step, where a lens 9, having a focal length f and placed at a distance d from the phase mask 3 is used to generate a distribution of incidence angles $\phi$ on the phase mask 3 and produce a linearly-chirped Bragg grating, as shown in FIG. 2.

Using the lens 9 produces an interference pattern for which the period P(x) varies linearly along the axis 5 of the fiber 1, given by the following expression:

$$P(x) = \frac{\Lambda}{2} \left( 1 - \frac{2 \times \alpha}{f-d} \eta \right) \quad [6]$$

-continued $$\text{where } \eta = \frac{1}{2} + \frac{1}{2}\left(1 - \frac{\lambda^2}{\Lambda^2}\right)^{-1/2}$$

Consequently, the grating reflects light of different wavelengths at different grating portions following:

$$\lambda_B(x) = 2n\, P(x) \qquad [7]$$

For a grating of length L, the spectral broadening associated with the chirp is then given by:

$$\Delta\lambda = \frac{2n\Lambda L\alpha\eta}{|f-d|} = \frac{2n\Lambda D\alpha\eta}{|f|} \qquad [8]$$

In this second preferred embodiment, the lens 9 is used to generate a distribution of incidence angles $\phi$ on the phase mask 3, resulting in a distribution of blazed angles $\delta$. In order to avoid any coupling of the propagating light outside the fiber 1, the following condition must be satisfied:

$$\arctan\left(\frac{D}{2f}\right) < \frac{1}{2}\arcsin\left(\frac{N.A.}{n}\right) \qquad [9]$$

For example, for a standard telecommunications fiber where n=1.45, N.A.=0.12, using a UV beam 7 of width D=10 mm, the smallest focal length f of the lens 9 that can be used is 120 mm. Using that focal length in combination with a tilt angle $\alpha$ of 1° leads to a grating having a bandwidth $\Delta\lambda$ of 4.5 nm.

Figure 7:
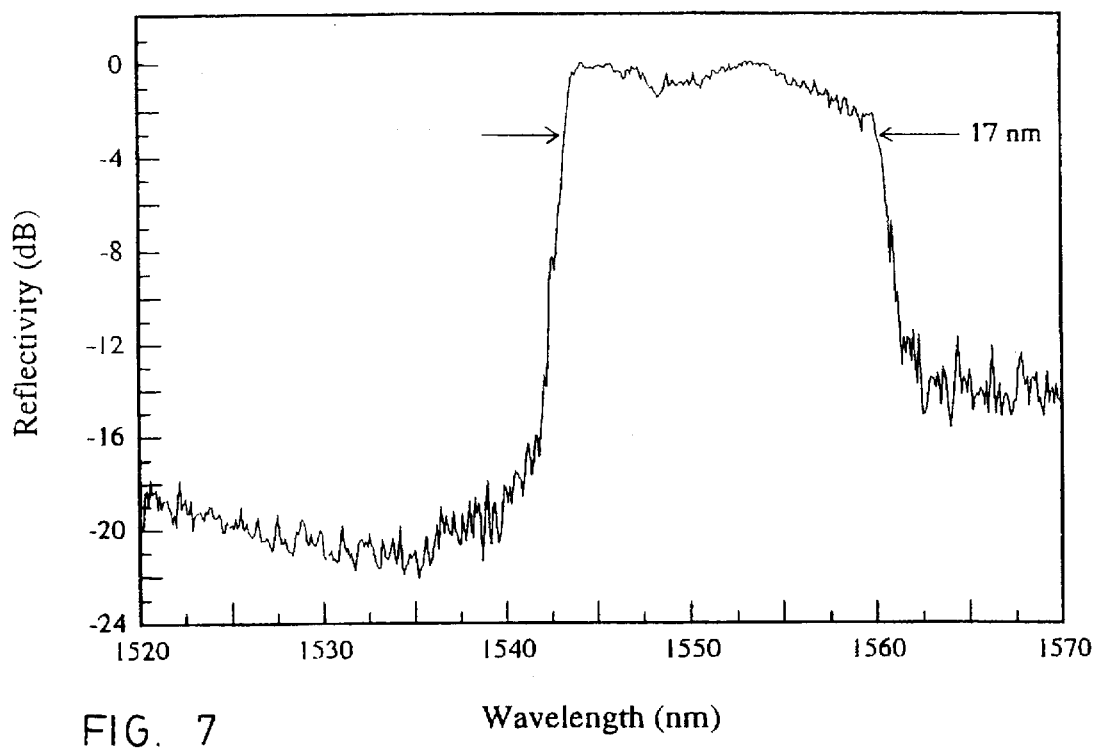
FIG. 7 show the reflection spectrum of a 17-nm bandwidth chirped fiber grating obtained using the second preferred embodiment of the invention.

In experimental tests, a divergent lens 9 having a focal length f of 50 mm was placed at a distance d of 20 mm from the phase mask 3 and a fiber 1 having a large numerical aperture was tilted at an angle $\alpha$ of 1.6°. A 14 mm-long Bragg filter was obtained, having the reflection spectrum shown in FIG. 7. The bandwidth $\Delta\lambda$ of this chirped grating is 17 nm, which is in accordance with the theoretical prediction of 17.3 nm from equations [6] and [7].

This method for obtaining a chirped grating is flexible and can be used for mass production.

Figure 3:
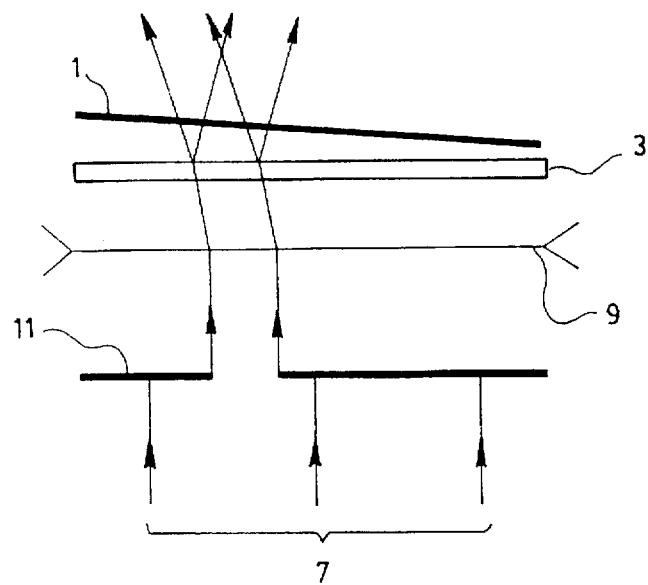
FIG. 3 is a schematic representation of the third preferred embodiment of the invention.

In a third preferred embodiment of the invention shown in FIG. 3, the method described above comprises the additional step of inserting a moving slit 11 between the UV beam 7 and the lens 9. Such a setup allows the amplitude of the Bragg grating to be adjusted in a controlled manner along the fiber axis 5. Moving the slit 11 at a variable velocity along the phase mask 3 allows a variation of the amount of UV radiation received by different portions of the fiber.

Since the grating is chirped, as discussed in the second preferred embodiment, there is a relationship between the position along the fiber 1 and the wavelength at which the grating reflects. By controlling the grating amplitude along the fiber axis 5, the transmission of the fiber 1 can be controlled as a function of the wavelength. This kind of filter may be used to adjust the transmission spectrum of a fiber device. For example, the gain spectrum of an optical amplifier may be flattened using this method.

This method of profiling the grating by using a moving slit 11 can also be used in combination with other chirped grating fabrication techniques to obtain the same result. For example, profiling a chirped fiber grating may be achieved by using a moving slit and a chirped phase mask.

Figure 8:
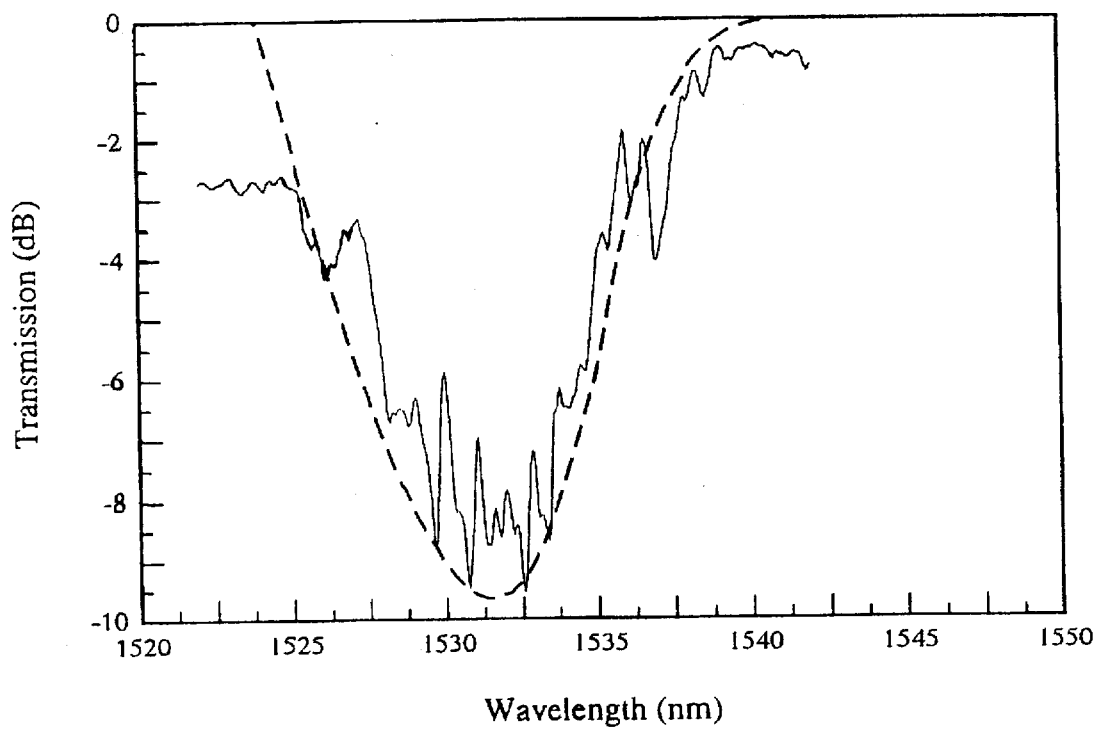
FIG. 8 shows a fitted (solid line) and target (broken line) transmission spectrum of a Bragg grating obtained using the third preferred embodiment of the invention.

Experimental tests using the third preferred embodiment, as shown in FIG. 3, yielded the transmission spectrum shown in FIG. 8. Using the transmission spectrum of a 15 nm bandwidth fiber grating, the dose of radiation was adjusted as a function of the position along the fiber axis 5 in order to fit the targeted transmission spectrum of FIG. 8. The result shows that a profiling of the transmission is possible with this method.

This method has the advantage that the beam is fixed with respect to the fiber 1 since only the slit 11 is moved along the axis 5, so that the phase of the beam 7 does not drift. Thus, such filters can be easily mass produced with a fair degree of accuracy.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A method for impinging gratings in an optical medium that is sensitive to at least some wavelengths of electromagnetic radiation, said medium having a longitudinal axis, said method comprising the steps of:

providing an optical phase mask of period $\Lambda$;

laying said phase mask close to said optical medium;

impinging a single beam of electromagnetic radiation on said phase mask such that said radiation is diffracted, thereby resulting in an interference pattern having a period P that is impinged into said optical medium;

inserting a lens of focal length f placed at a distance d from said phase mask to produce a distribution of incidence angles on said phase mask such that said period of said interference pattern varies linearly along said longitudinal axis, inserting a slit between said single beam and said lens; and sliding said slit in a direction perpendicular to said beam at a variable velocity;

wherein:

said single beam of electromagnetic radiation is impinged at an incidence angle $\phi$ with respect to normal incidence on said phase mask;

said phase mask is at an angle $\alpha$ with respect to said longitudinal axis of said optical medium; and said incidence angle $\phi$ is equal to said angle $\alpha$ and is different from zero;

whereby said period P of said interference pattern can be altered by changing said incidence angle $\phi$ or said angle $\alpha$.

2. In a method for impinging gratings in an optical medium that is sensitive to at least some wavelengths of electromagnetic radiation, said medium having a longitudinal axis, said method comprising the steps of:

providing a chirped optical phase mask of variable period;

laying said chirped phase mask close to said optical medium; and impinging a single beam of electromagnetic radiation on said chirped phase mask such that an amount of said radiation is diffracted, thereby resulting in an interference pattern having an amplitude and a period varying linearly along said longitudinal axis that is impinged into said optical medium;

the improvement wherein:

a slit is inserted between said single beam and said chirped phase mask; and said slit is slid in a direction perpendicular to said single beam at a variable velocity, whereby said amount of radiation that is impinged into said optical medium is adjusted, thereby modifying said amplitude of said interference pattern along said optical medium.

* * * * *